United States Patent [19]

Küter et al.

[11] 4,052,629

[45] Oct. 4, 1977

[54] ROTATING RECTIFIER ASSEMBLY

[75] Inventors: Heinrich Küter, Wattenscheid; Gerhard Krieger, Mulheim, both of Germany

[73] Assignee: Kraftwerk Union Aktiengesellschaft, Mulheim (Ruhr), Germany

[21] Appl. No.: 635,674

[22] Filed: Nov. 26, 1975

[30] Foreign Application Priority Data

Dec. 5, 1974 Germany ............................ 2457585

[51] Int. Cl.² .......................................... H02K 11/00
[52] U.S. Cl. ................................................ 310/68 D
[58] Field of Search .................. 310/68, 68 D, 72, 59, 310/61; 318/242

[56] References Cited

U.S. PATENT DOCUMENTS

| 3,283,219 | 11/1966 | Keady | 310/68 |
| 3,371,235 | 2/1968 | Hoover | 310/68 |
| 3,721,843 | 3/1973 | Spisak | 310/72 |
| 3,723,794 | 3/1973 | Spisak | 310/68 D |
| 3,829,725 | 8/1974 | Petersen | 310/72 |
| 3,852,628 | 12/1974 | Spisak | 310/68 D |
| 3,965,379 | 6/1976 | Meusel | 310/59 |

Primary Examiner—R. Skudy
Attorney, Agent, or Firm—Herbert L. Lerner

[57] ABSTRACT

An electrical machine having a rotary shaft includes a rotating rectifier assembly connected in a three-phase current bridge circuit and comprising two support wheels mounted on the shaft in insulated relationship with respect thereto and formed with respective annular flanges, active components of the rectifier assembly comprising heat sinks, rectifier cells and fuses disposed at the inner periphery of the annular flanges, the two support wheels forming direct current poles and comprising an intermediate ring formed of nonmagnetic material insulatedly mounted on the shaft and a support wheel hub directly shrink-fitted on the intermediate ring, the shaft being formed with an axial bore, direct current conductors disposed in the axial bore, and at least one current connecting bolt radially passing through the intermediate ring and into the shaft, the bolt having a head in contact with the support wheel hub and the intermediate ring, and a shank in contact with one of the direct current conductors.

7 Claims, 5 Drawing Figures

ROTATING RECTIFIER ASSEMBLY

The invention relates to a rotating rectifier assembly and more particularly to such an assembly connected in a three-phase current bridge circuit for electrical machines and including two support wheels mounted insulatedly on the shaft of the machine and having ring flanges, at the inner periphery of which active components in the form of heat sinks, rectifier cells and fuses are disposed, both of the support wheels forming direct current poles, direct current being conducted through radial bolts to direct current conductors extending axially within the shaft.

Such a device has become known heretofore from U.S. Pat. No. 3,721,843 wherein all of the components belonging to one of the parallel branches, including the respective feed-in three-phase current conductor, are disposed in one radial plane of the support wheel. The maximal occupancy of a wheel by active components presupposes many useful radial planes as are provided with the smallest possible uniform divisions about the periphery. Since the three-phase current conductors are also disposed in uniform divisions or graduations at the shaft periphery, the difficulty arises of accommodating the radial current connecting bolts between the direct current poles and the direct current conductors disposed axially in the shaft, unless the three-phase current conductor already in the region of the one ring flange is led from the shaft surface radially outwardly to the inner periphery of this flange, which means additional centrifugal forces and difficulties for the respective connections. Because turbogenerators, for which such rectifier assemblies generally find use, operate moreover in a hydrogen atmosphere and the hydrogen can flow in the shaft along the direct current conductors, special sealing measures must be taken for conventional radial current connecting bolts, which can readily lead to leaks as a result of varying thermal expansions.

It is accordingly an object of the invention to provide a rotating rectifier assembly wherein the support wheels and the radial current connecting bolts are constructed so that the occupancy of the shaft periphery by three-phase current conductors in uniform spacing from one another is possible and the size of the division or spacing between the three-phase current conductors in the shaft periphery is not determined or conditioned upon the current connecting bolts. Moreover, in accordance with a further object of the invention, adequate gastightness against any possible hydrogen accumulation in the central bore of the shaft is assured with relatively simple means, and assembly and disassembly of all of the parts belonging to the direct current conduction for testing and overhauling purposes are made possible at relatively low cost.

With the foregoing and other objects in view, there is provided, in accordance with the invention, in an electrical machine having a rotary shaft, a rotating rectifier assembly connected in a three-phase current bridge circuit and comprising two support wheels mounted on the shaft in insulated relationship with respect thereto and formed with respective annular flanges, active components of the rectifier assembly comprising heat sinks, rectifier cells and fuses disposed at the inner periphery of the annular flanges, the two support wheels forming direct current poles, and comprising an intermediate ring formed of nonmagnetic material insulatedly mounted on the shaft and a support wheel hub directly shrink-fitted on the intermediate ring, the shaft being formed with an axial bore, direct current conductors disposed in the axial bore, and at least one current connecting bolt readially passing through the intermediate ring and into the shaft, the bolt having a head in contact with the support wheel hub and the intermediate ring, and a shank in contact with one of the direct current conductors.

In accordance with another feature of the invention, the intermediate ring is formed with substantially uniformly peripherally spaced-apart lead-ins for three-phase current conductors.

In accordance with a further feature of the invention, the head of the current connecting bolt has a larger diameter than that of the shank thereof, and radial threaded members threadedly fasten the bolt head to the intermediate ring.

In accordance with an added feature of the invention, the current connecting bolt has an end at the shank thereof projecting into a radial bore formed in the respective direct current conductor, the end of the bolt shank being formed with an inwardly tapering conical axial bore and radially extending notches forming a spread contact at the end, and including a conical insert received in the spread contact, and clamping bolt means extending axially through a bore formed in the current connecting bolt and threadedly secured in the conical insert so as to clamp the insert against the spread contact.

In accordance with an additional feature of the invention, sheet metal insert means are disposed between a projecting underside portion of the body head and a corresponding engagement surface of the intermediate ring.

In accordance with yet another feature of the invention, the bolt head is formed with lateral recesses as lead-ins for three-phase current conductors.

In accordance with a concomitant feature of the invention, the current connecting bolt extends with lateral clearance through a bore formed in the intermediate ring, and at least one row of contact-laminate tapes are disposed in the lateral clearance.

With such a construction of the support wheels, current connecting bolts and other components of the rectifier device of the invention, occupancy of the shaft periphery by three-phase current conductors at a uniform division or spacing from one another is rendered possible.

Other features which are considered as characteristic for the invention are set forth in the appended claims.

Although the invention is illustrated and described herein as embodied in a rotating rectifier assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
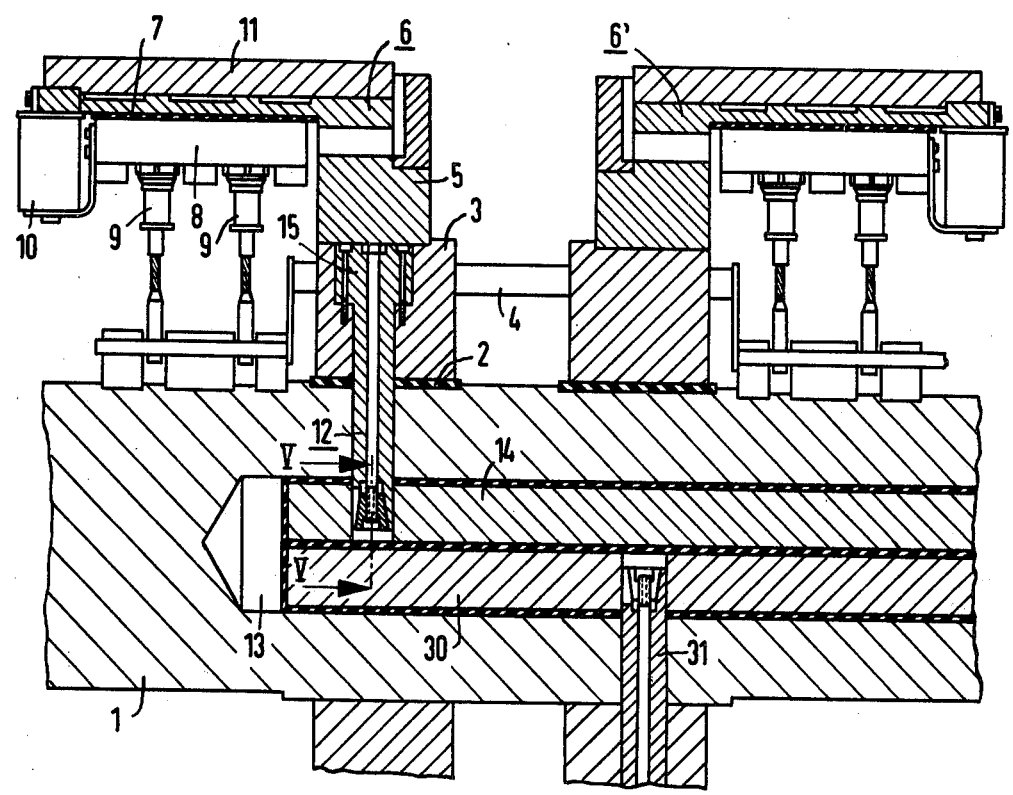
FIG. 1 is a radially extending longitudinal sectional view of a rectifier assembly having two support wheels constructed in accordance with the invention.
Figure 2:
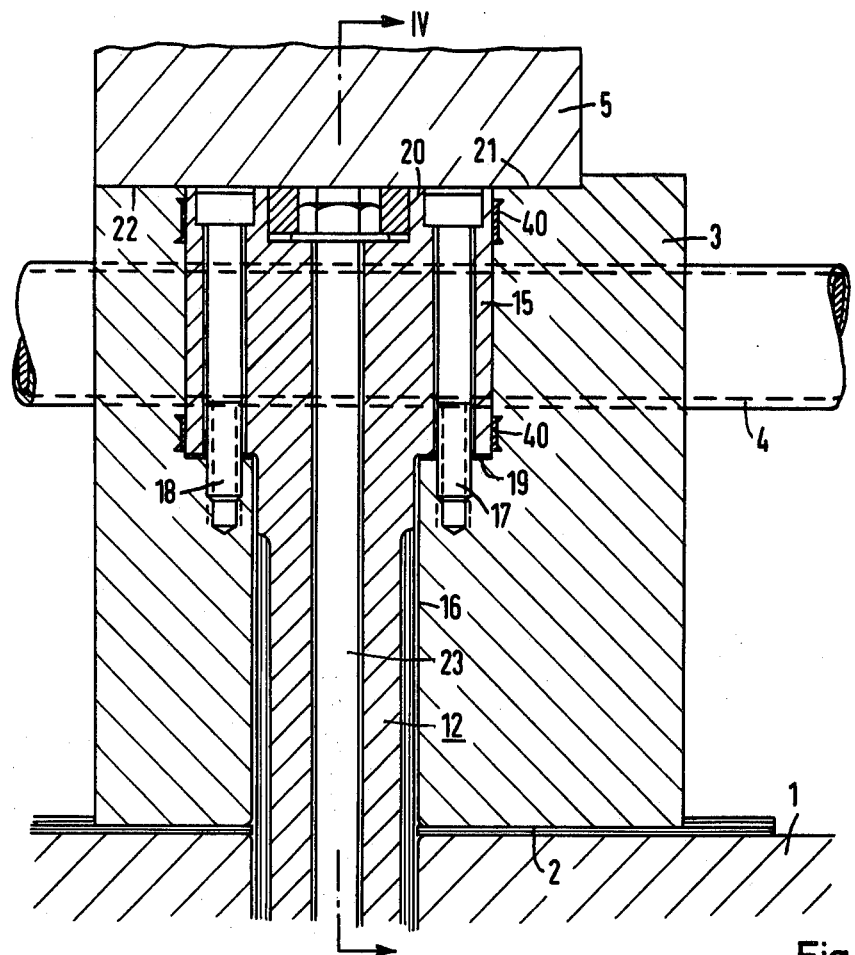
FIG. 2 is an enlarged fragmentary view of FIG. 1 showing the head and part of the shank of a current connecting pin or bolt and an intermediate ring according to the invention.
Figure 4:
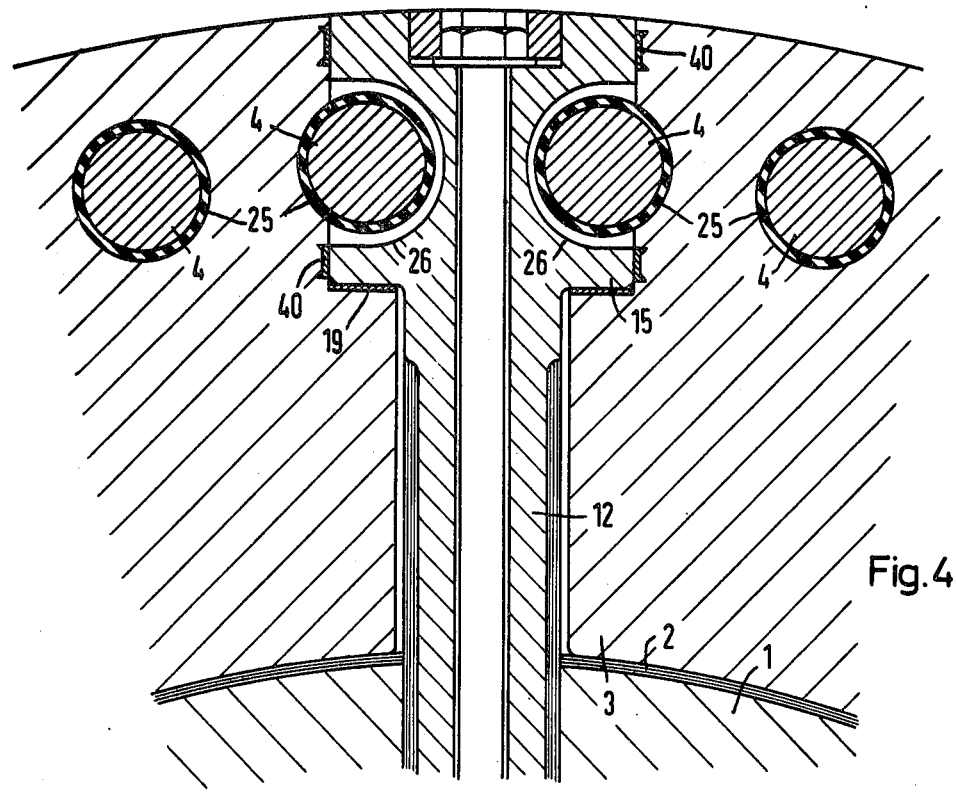
Figure 5:
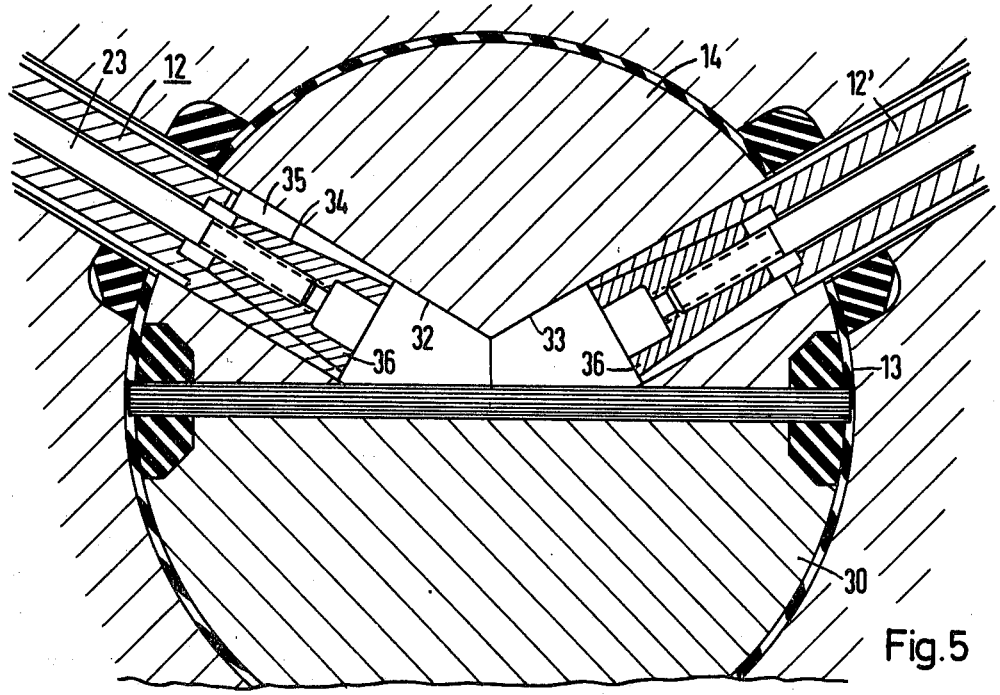

FIG. 4 is a cross-sectional view of FIG. 2 taken along the line IV—IV in the direction of the arrows and showing the intermediate ring in vicinity of a current connecting bolt and adjacent three-phase current conductors; and FIG. 5 is an enlarged fragmentary cross-sectional view of FIG. 1 taken along the line V—V in the direction of the arrows and showing direct current conductors disposed in a shaft bore in vicinity of the introduced ends of a pair of radially extending current connecting bolts.

Referring now to the drawing and first, particularly, to FIG. 1 thereof, an intermediate ring 3 of nonmagnetic material is shown mounted with an intervening layer 2 of insulating material on a shaft 1 of an otherwise non-illustrated excitation machine or generator. The nonmagnetic intermediate ring 3 serves as a bushing or lead-in for three-phase current conductors 4 as will be described more fully hereinafter. A hub 5 of a support wheel 6 per se is shrink-fitted without insulation on the intermediate ring 3. The support wheel 6 is furthermore provided at the outer periphery thereof with an annular flange or flange ring 7 formed integrally with the hub 5 and carrying all of the active components of the rectifier assembly of the invention, such as cooling elements or head sinks 8, rectifier cells or diodes 9 and fuses 10. A cap ring 11 of high-strength material is additionally shrink-fitted on the radially inwardly disposed flange ring 7 for absorbing centrifugal forces produced by the foregoing active components 8, 9, 10 and the like. The support wheel 6 simultaneously forms one of the direct-current poles of the rectifier assembly of the invention, while the other pole is formed by the support wheel 6' which is constructed in a similar manner though a mirror image of the support wheel 6 and is assembled back-to-back with the latter.

In order to attain optimal utilization of the annular flanges 7 of the respective support wheels 6 and 6' for accommodating the active components in as many radial planes as possible for the smallest possible uniform division or graduation at the periphery, and in order to dispose the three-phase current conductors simultaneously also in uniform or even division at the periphery of the shaft 1, the direct current is conducted, in accordance with the invention, directly from the support wheel hub 5 through at least one radial bolt 12 into a respective direct-current conductor 14 laid in an axially-extending bore 13 of the shaft 1. The current connecting bolt 12 extends through the intermediate ring 3 and the shaft 1 in radial direction to the direct-current conductor 14, the head 15 of the bolt 12 being in electrical contact both with the support wheel hub 5 as well as with the intermediate ring 3.

Figure 3:
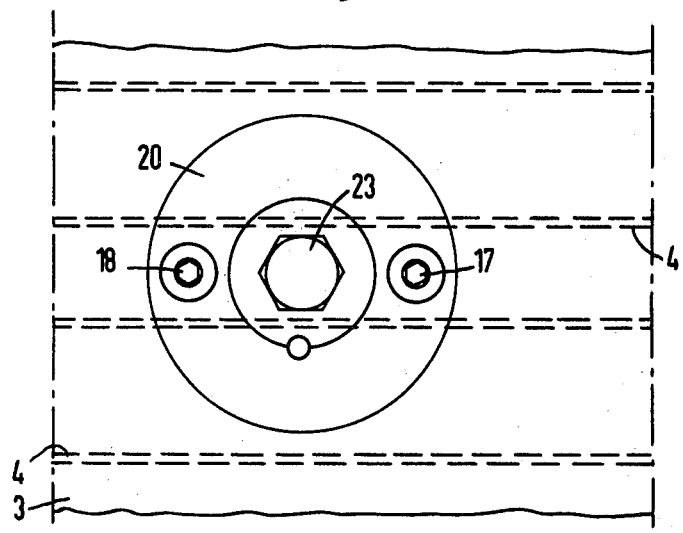
FIG. 3 is a top plan view of the bolt head and intermediate ring of FIG. 2.

This manner of contacting and guidance of the bolt 12 is shown on an enlarged scale in FIGS. 2 and 3. The bolt 12 that is insertable from the outside radially to the shaft 1 into a suitable bore 16 formed in the intermediate ring 3 has a head 15 of greater diameter than the shank or shaft per se of the bolt 12. The bolt head 15 is firmly tightened or braced against the intermediate ring 3 by radially extending screws 17 and 18 that are located at and extend through corresponding bores formed in the vicinity of the outer periphery of the bolt head 15. In order to attain good contact between the surface 20 of the bolt head 15 and the press-fitting surface 21 of the support wheel hub 5, the surface 20 may be finish-machined together with the outer surface 22 of the intermediate ring 3 after the bolt 12 has been inserted. By introducing a sheet metal washer or similar insert 19 between the outwardly jutting underside of the bolt head 15 and the corresponding engagement surface of the intermediate ring 3, exactly defined contact pressures result therefrom together with the shrink-fitting compression by the support wheel hub 5. In order, additionally, to improve the contact between the peripheral surface of the bolt head 15 and the intermediate ring 3, one or more rows of conductive contact-laminate tapes or strips 40 can be disposed in the gap between the bolt head 15 and the surface defining the bore 16 that is formed in the intermediate ring 3. The bolt 12 is provided futhermore with a clamping bolt 23 extending axially through a corresponding axial bore formed in the bolt 12. The clamping bolt 23 serves to tighten or clamp the current conducting bolt 12 to the direct-current conductor 14 (FIG. 1) as described hereinafter in greater detail.

As is readily apparent in FIG. 4, axial bores 25 are provided at uniform divisions i.e. at equal peripheral spacing, in the vicinity of the outer periphery of the intermediate ring 3, and three-phase current conductors 4 extend therethrough i.e. through the intermediate ring 3, from the non-illustrated three-phase current exciter or excitation machine to the rectifier cells 9 of the support wheel 6 (note FIG. 1). In order to be able to maintain a uniform division of these three-phase current conductor passageways or lead-ins, the head 15 of the bolt 12 is formed with lateral recesses 26 which are aligned with respective bores 25 formed in the intermediate ring 3. The function of the radial current connecting bolts 12 is not impaired thereby, however, because adequate current-conducting cross section still remains available. It is possible, however, if desired, to slightly stagger or offset the bores 25 which intersect with the bolt head 15, with respect to the divisions or graduations between the respective bores 25 so that the latter are located at a greater distance from one another than the distance between those bores 25 which do not intersect with the bolt head 15.

FIG. 5 illustrates in cross section the axial bore 13 formed in the shaft 1 as well as the two direct-current conductors 14 and 30 which, as was already apparent from FIG. 1, are connected through the bolts 12 and 31, respectively, to the corresponding support wheels or direct-current poles 6 and 6'. In the illustrated embodiment of FIG. 5, two current connecting bolts 12 and 12' are provided by the respective support wheel 6 and terminate in suitable radial bores 32 and 33 in the associated direct-current conductor 14. For firmly contacting the bolt, respectively, with the conductor 14, the lower end of the bolt, as viewed in FIG. 4, is formed with an inwardly tapering bore 34 and with corresponding radially extending notches 35. A conical insert 36 is seated in the thus-formed split or spread contact 35 and is clamped or tightened against the split contact 35 by the clamping bolt 23, which is threadedly secured in the insert 36 and extends axially through the bolt 12. Consequently, on the one hand, firm contact with the respective direct-current conductor 14 is assured, yet, on the other hand, sliding in radial direction for varying thermal expansions is afforded.

With the aforedescribed assembly according to the invention, a relatively simple current connection from the support wheel 6, 6' to the direct-current conductors 14, 30 disposed in the shaft 1 is possible, without hindrance to disposing three-phase current conductors 4 at uniform graduations or distances from one another at and about the periphery of the shaft 1. Moreover, assembly and disassembly of the complete direct-current conductor 14, 30 after the support wheel 6, 6' has been shrink-fitted is possible. Also, no separate sealing is required at the current-conducting bolts 12, 12' in case of a possible defect in the hydrogen seals at the generator side, because all conceivable outlets for hydrogen gas at the radial bores are surrounded by surfaces on which the intermediate ring or support wheel hub 5 are shrink-fitted. This does not, of course, provide absolute leak-proof tightness, however, when taken together with additional measures, such as an air exchange beneath the exciter cover, for example, adequate tightness or imperviousness is assured without requiring any special gas sealing systems which are subject to a high incidence of failure and breakdown.

We claim:

1. In an electrical machine having a rotary shaft, a rotating rectifier assembly connected in a three-phase current bridge circuit and comprising two support wheels mounted on the shaft in insulated relationship with respect thereto and formed with respective annular flanges, active components of the rectifier assembly comprising heat sinks, rectifier cells and fuses disposed at the inner periphery of said annular flanges, said two support wheels forming direct current poles and comprising an intermediate ring formed of nonmagnetic material insulatedly mounted on the shaft and a support wheel hub directly shrink-fitted on said intermediate ring, the shaft being formed with an axial bore, direct current conductors disposed in said axial bore, and at least one current connecting bolt radially passing through said intermediate ring and into the shaft, said bolt having a head in contact with said support wheel hub and said intermediate ring, and a shank in contact with one of said direct current conductors.

2. Rectifier assembly according to claim 1 wherein said intermediate ring is formed with substantially uniformly peripherally spaced-apart lead-ins for three-phase current conductors.

3. Rectifier assembly according to claim 1 wherein said head of said current connecting bolt has a larger diameter than that of said shank thereof, and including radial threaded members threadedly fastening said bolt head to said intermediate ring.

4. Rectifier assembly according to claim 1 wherein said current connecting bolt has an end at said shank thereof projecting into a radial bore formed in the respective direct current conductor, said end of said bolt shank being formed with an inwardly tapering conical axial bore and radially extending notches forming a spread contact at said end, and including a conical insert received in said spread contact, and clamping bolt means extending axially through a bore formed in said current connecting bolt and threadedly secured in said conical insert so as to clamp said insert against said spread contact.

5. Rectifier assembly according to claim 1 including sheetmetal insert means disposed between a projecting underside portion of said bolt head and a corresponding engagement surface of said intermediate ring.

6. Rectifier assembly according to claim 1 wherein said bolt head is formed with lateral recesses as lead-ins for three-phase current conductors.

7. Rectifier assembly according to claim 1 wherein said current connecting bolt extends with lateral clearance through a bore formed in said intermediate ring, and including at least one row of contact-laminate tapes disposed in said lateral clearance.

* * * * *